(12) United States Patent
Hämäläinen

(10) Patent No.: US 6,929,677 B2
(45) Date of Patent: Aug. 16, 2005

(54) METHOD FOR LEACHING COPPER CONCENTRATE

(75) Inventor: Matti Hämäläinen, Aittaluodonkatu (FI)

(73) Assignee: Outokumpu Technology Oy, Espoo (FI)

(*) Notice: Subject to any disclaimer, the term of this patent is extended or adjusted under 35 U.S.C. 154(b) by 48 days.

(21) Appl. No.: 10/451,196

(22) PCT Filed: Dec. 11, 2001

(86) PCT No.: PCT/FI01/01080

§ 371 (c)(1),
(2), (4) Date: Jun. 19, 2003

(87) PCT Pub. No.: WO02/50319

PCT Pub. Date: Jun. 27, 2002

(65) Prior Publication Data

US 2004/0060395 A1 Apr. 1, 2004

(30) Foreign Application Priority Data

Dec. 20, 2000 (FI) .............................. 20002802

(51) Int. Cl.$^7$ ................................. C22B 3/08
(52) U.S. Cl. ........................... 75/743; 423/34; 423/140
(58) Field of Search ..................... 75/743, 740; 423/34, 423/140

(56) References Cited

U.S. PATENT DOCUMENTS

| | | | | |
|---|---|---|---|---|
| 3,972,711 A | * | 8/1976 | Goens et al. | 75/718 |
| 4,148,698 A | | 4/1979 | Everett | 204/118 |
| 4,197,117 A | * | 4/1980 | Pemsler et al. | 75/740 |
| 5,487,819 A | | 1/1996 | Everett | 205/347 |
| 6,007,600 A | * | 12/1999 | Hyvarinen et al. | 75/740 |

* cited by examiner

*Primary Examiner*—Melvyn Andrews
(74) *Attorney, Agent, or Firm*—Morgan & Finnegan, L.L.P.

(57) ABSTRACT

This invention relates to a method where sulfidic iron-bearing copper concentrate is leached on the countercurrent principle, in a chloride environment. The leaching takes place with the aid of bivalent copper and an oxygen-bearing gas as a multi-stage continuous process, under normal pressure, at a temperature, which as highest corresponds to the boiling point of the solution. Part of the insoluble solid matter is returned, counter to the main flow of solid matter, to one of the previous leaching stages or reactors where, as a result of the extended leaching time, the leach waste iron is recovered mostly as hematite.

10 Claims, No Drawings

METHOD FOR LEACHING COPPER CONCENTRATE

This invention relates to a method where sulfidic iron-bearing copper concentrate is leached on the countercurrent principle, in a chloride environment. The leaching takes place with the aid of bivalent copper and an oxygen-bearing gas as a multistage continuous process, under normal pressure, at a temperature which at highest corresponds to the boiling point of the solution. Part of the insoluble solid matter is returned, counter to the main flow of solid matter, to one of the previous leaching stages or reactors where, as a result of the extended leaching time, the leach waste iron is recovered mostly as hematite.

Countercurrent leaching of a copper-bearing raw material, such as sulfidic concentrate, is described in the prior art, for example in U.S. Pat. No. 5,487,819. The sum reaction of the copper pyrite/chalcopyrite leaching is given in the publication as follows:

$$CuFeS_2 + Cu^{2+} + \tfrac{3}{4}O_2 + \tfrac{1}{2}H_2O = FeOOH + 2Cu^{1+} + 2S^0 \quad (1)$$

From the reaction it can be seen that the iron is removed from the leach as goethite precipitate. Later on, in an article concerning the same process; P. K. Everett: "Development of the Intec Copper Process by an International Consortium, Hydrometallurgy 1994, IMM-SCI, Cambridge, England, 11–15 July 1994", it is noticed, that leaching takes place in three stages at a temperature of about 80–85° C. and the goethite obtained is akaganeite, or beta-goethite (β-goethite). Furthermore, in the article describing the same process; A. J. Moyes et al: "Operation of the Intec Copper 'One' TPD Demonstration Plant, Alta 1998 Copper Sulphides Symposium, Brisbane, Australia, Oct. 19, 1998", there is a flowchart of the process on page 19. According to this flowchart the countercurrent leaching takes place in three stages, in each of which there are three reactors, and precipitation is carried out between the stages.

According to the basic literature of chemistry, akaganeite is goethite in its metastable form, which on this basis, is not an especially beneficial form for waste. It is known in the hydrometallurgy of zinc, that iron precipitate can take three forms: jarosite, goethite or hematite. It is also known that hematite is the most stable compound and is thus the correct means of disposal in the long run. The disadvantage of hematite has been, however, the fact that it is the most expensive to manufacture, since hematite requires autoclave conditions for its formation. On page 223 of the article by F. W. Schweitzer et al: "Duval's CLEAR Hydrometallurgical Process, Chloride Electrometallurgy, AIME, 1982, New York", it is mentioned that hematite is formed at a temperature above 150° C.

We have also noticed that, in countercurrent leaching according to the prior art described above, the capacity of the leaching reactors is not utilized to the full. In the method the solid matter travels straight through the leaching equipment, but in relation to the leaching of solid matter, this propagation rate is not the optimum. From the standpoint of the leaching of solid matter, it is preferable to have as long a delay as possible.

The developed method relates to the leaching of a sulfidic, iron-bearing copper concentrate in a chloride milieu, to achieve an essentially iron-free, alkali chloride-copper chloride solution and to recover the iron as precipitate. The leaching is carried out continuously on the countercurrent principle and in several stages. The copper concentrate is leached in atmospheric conditions at a temperature, which at highest corresponds to the boiling point of the solution, and the iron in the concentrate is precipitated mainly as hematite. The essential features of the invention are presented in the enclosed patent claims.

It is characteristic of the present invention, that the concentrate is leached by long delay. By long delay is meant, that the leaching time of the solid matter is clearly longer than the flow-through time of the process solution in the opposite direction. A long solid-matter leaching time is possible to achieve by recycling, or returning, the solid matter from the leaching stage, against the direction of propagation of the main flow of the other solid matter, or by recycling, or returning, the solid matter within any leaching stage. Returning the solid matter to leaching enables the formation of hematite, since we have noticed that iron can precipitate as hematite in atmospheric conditions, if the leaching time of the solid matter is sufficiently long and the solid matter content is sufficiently high. The long leaching time resulting from solid matter recycling also allows the fullest possible utilization of the capacity of the leaching reactors.

So, according to the developed method, the solid matter is recycled in the process by returning it from the end of the process to the beginning. Thus, within any stage of the process comprising several reactors, the solid matter is returned from reactors of the final end of the stage to a reactor at the beginning, or recycling can be realized even in a single reactor. At the end of every stage, or after the reactor, the separation of liquid and solid matter takes place, generally by means of a thickener. The solution, the overflow, produced between the stages from separation, is conducted to the previous stage in regard to the flow direction of the solid matter and the solid matter precipitate, the underflow, mostly to the next leaching stage. According to the invention now, part of the underflow of one or every stage is returned to any previous or to the same leaching stage to any reactor, preferably to the first reactor.

According to our experience, when using commercial concentrates (25% Cu), it is preferable that the solid matter content in the first reactor of the stage is at least 250 g/l. Recycling of the solid matter creates favorable conditions for the nucleation and crystal growth of hematite. According to the invention, the solid matter is recycled in such a way that the leaching time of the solid matter is at least twice, preferably three times that of the leaching where the solid matter is not recycled, or returned. In our experience the formation of hematite requires at least 10 hours' leaching time.

When copper concentrate is leached in a chloride milieu, the iron contained in the concentrate dissolves first as bivalent, but oxygen-bearing gas, such as air, is blown into the leaching reactors, so that the leached iron oxidizes into trivalent and precipitates from the solution. In addition, the precipitate contains sulfur of the raw material as elemental. As stated above, iron can be precipitated as hematite even in atmospheric conditions, when the leaching time is sufficiently long and enough precipitation nuclei are present. Hematite and goethite differ clearly in color, —goethite is gray and hematite red—so they are clearly identifiable on the basis of color.

The method of the present invention is further described with reference to the enclosed example.

EXAMPLE

A comparison was made between the method of the present invention and traditional technology, and two test campaigns were carried out. In both test campaigns the method was tested in a three-stage process. In the first and in the last stages there was one reactor and in the second there were two reactors, in other words, four reactors altogether. Between all stages there was a thickener, from which the solid matter was led to the following stage and the solution obtained as thickener overflow was conducted to the previous stage. The reactors and stages are numbered according to the flow direction of the solid matter. In the test campaign, a NaCl—CuCl solution was fed into the last reactor, R4, and the chalcopyrite concentrate into the first reactor, R1. The results are presented in Table 1.

Test campaign 1 was countercurrent leaching according to the prior art, which was carried out in reactors, all of which were of 10 liters. Solid matter was neither recycled between nor within the stages. The temperature of the reactors was maintained at 95° C.

Test campaign 2 is an example of an adaptation of the method according to the invention in countercurrent leaching. There were also four reactors in test campaign 2, and the capacity of all reactors was 5 liters. The temperature of the reactors in test campaign 2 was maintained at 85° C. In this test campaign the solid matter was recycled within the same stage so that the thickener underflow of each stage was recycled to the first reactor of the same stage. As can be seen in Table 1, the solid matter content was two-three times that of test campaign 1. Thus a delay built up for the solid matter, which was almost three times longer compared to the delay in test campaign 1.

From the test campaigns it can be seen that an equally good recovery was more or less gained in all runs, but the first campaign required reactors, which were 100% larger and a temperature 10° C. higher. It can also be concluded from test campaign 1 that the higher temperature effected the leaching of a greater part of the sulfur in the concentrate than the lower temperature of campaign 2.

On the basis of the color of the precipitate of the reactors, it was possible to deduce that in test campaign 2, hematite started to appear in the solid matter from the second reactor (R2) onwards, and in the last reactor (R4) the iron was mostly in the form of hematite. In test campaign 1, the iron was mostly in the form of goethite even in the last reactor. Approximations were confirmed also by X-ray diffraction analyses.

TABLE 1

|  | Quantity | Test campaign 1 | Test campaign 2 |
| --- | --- | --- | --- |
| Concentrate feed into reactor R1 | g/h | 260 | 240 |
| Cu content of concentrate | % | 23.10 | 24.2 |
| Fe content of concentrate | % | 30.4 | 30.9 |
| S content of concentrate | % | 37.0 | 34.5 |
| Solution feed into reactor R4 | L/h | 2.11 | 1.49 |
| Cu content of solution feed | g/L | 39.2 | 41.1 |
| Fe content of solution feed | g/L | 0.41 | 0.0 |
| Na content of solution feed | g/L | 105 | 107 |
| $SO_4$ content of solution feed | g/L | 4.5 | 0.0 |
| Air feed into reactor R1 | L/min | 0.0 | 1.9 |
| Air feed into reactor R2 | L/min | 8.9 | 5.0 |
| Air feed into reactor R3 | L/min | 0.9 | 1.7 |
| Air feed into reactor R4 | L/min | 0.7 | 1.2 |
| Total air feed | L/min | 10.5 | 9.9 |
| Temperature in reactor R1 | ° C. | 95 | 85 |
| Temperature in reactor R2 | ° C. | 95 | 85 |
| Temperature in reactor R3 | ° C. | 95 | 85 |
| Temperature in reactor R4 | ° C. | 95 | 85 |
| Average temperature | ° C. | 95 | 85 |
| Solid matter content in R1 | g/L | 116 | 363 |
| Solid matter content in R2 | g/L | 106 | 251 |

TABLE 1-continued

|  | Quantity | Test campaign 1 | Test campaign 2 |
| --- | --- | --- | --- |
| Solid matter content in R3 | g/L | 71 | 219 |
| Solid matter content in R4 | g/L | 41 | 105 |
| Average solid matter content | g/L | 84 | 235 |
| Cu content of solid matter in R4 | % | 0.87 | 1.08 |
| Fe content of solid matter in R4 | % | 43.1 | 45.1 |
| S content of solid matter in R4 | % | 13.5 | 21.6 |
| Cu(kok) in solution produced in R1 | g/L | 66.3 | 78.1 |
| Cu ($^{2+}$) in produced solution in R1 | g/L | 14.6 | 19.7 |
| Fe in produced solution in R1 | g/L | 2.04 | 0.32 |
| $SO_4$ in produced solution in R1 | g/L | 18.3 | 10.5 |
| Cu recovered in solution | % | 97.3 | 96.9 |

What is claimed is:

1. A method for leaching sulfidic, iron-bearing copper concentrate in a chloride milieu to obtain an essentially iron-free, alkali chloride-copper chloride solution, and recovering iron and elemental sulfur as a solid matter precipitate, the method comprising: leaching continuously and countercurrently in several stages, wherein each stage has at least one reactor, with bivalent copper and oxygen-bearing gas; leaching the copper concentrate in atmospheric conditions at a temperature which at highest corresponds to the boiling point of the solution; and leaching the solid matter by long delay by returning part of said solid matter to leaching countercurrently; and precipitating the iron from the concentrate mainly as hematite.

2. The method according to claim 1, wherein the solid matter is returned, with regard to the direction of solid matter flow, to said at least one reactor of a previous stage, so that the solid matter is leached for a time prolonged by at least twice compared to a leaching time without recycling.

3. The method according to claim 2, wherein at the end of each stage there is liquid-solid matter separation, of which the solid matter precipitate obtained as underflow is recycled to said at least one reactor of the previous stage.

4. The method according to claim 2, wherein at the end of each stage there is liquid-solid matter separation, of which the solid matter precipitate obtained as underflow is recycled to a first reactor of any previous stage.

5. The method according to claim 1, wherein the solid matter is returned within the same stage, to a previous reactor, with regard to the direction of solid matter flow, so that the leaching time of the solid matter is prolonged by at least twice, compared to a leaching time without recycling.

6. The method according to claim 5, wherein at the end of every stage there is liquid-solid matter separation, of which the solid matter precipitate obtained as underflow is recycled to said at least one reactor of the same stage.

7. The method according to claim 5, wherein at the end of every stage there is liquid-solid matter separation, of which the solid matter precipitate obtained as underflow is recycled to a first reactor of the same stage.

8. The method according to claim 1, wherein the solid matter is recycled in single reactor.

9. The method according to claim 1, wherein the amount of solid matter in a first reactor of the stage is at least 250 g/L.

10. The method according to claim 1, wherein leaching time of the solid matter is at least 10 h.

* * * * *